United States Patent
Trabert et al.

(10) Patent No.: US 6,906,888 B1
(45) Date of Patent: Jun. 14, 2005

(54) METHOD FOR WRITE TRACK PLACEMENT CORRECTION

(75) Inventors: Steven G. Trabert, Boulder, CO (US); Richard A. Gill, Arvada, CO (US)

(73) Assignee: Storage Technology Corporation, Louisville, CO (US)

(*) Notice: Subject to any disclaimer, the term of this patent is extended or adjusted under 35 U.S.C. 154(b) by 381 days.

(21) Appl. No.: 10/151,829

(22) Filed: May 20, 2002

(51) Int. Cl.[7] .................................. G11B 5/584
(52) U.S. Cl. .................... 360/77.13; 360/77.12; 360/31
(58) Field of Search .................... 360/31, 53, 75, 360/77.01, 77.12, 77.13; 714/771; 73/1.79–1.81

(56) References Cited

U.S. PATENT DOCUMENTS

| | | | |
|---|---|---|---|
| 6,430,008 B1 * | 8/2002 | Trabert et al. | 360/317 |
| 6,462,899 B1 * | 10/2002 | Chliwnyj et al. | 360/77.12 |
| 6,768,606 B2 * | 7/2004 | Helms | 360/77.01 |
| 2002/0163752 A1 * | 11/2002 | Peterson | 360/76 |

* cited by examiner

Primary Examiner—David Hudspeth
Assistant Examiner—Jason Olson
(74) Attorney, Agent, or Firm—Yee & Associates, P.C.

(57) ABSTRACT

A method for correcting data track placement in a magnetic tape drive is provided. The invention comprises writing at least one data track on a magnetic tape, wherein the data track is written in a location determined by tracking a servo track on the tape. The tape drive reads the data track(s) at a plurality of offset positions, wherein each offset position is determined by deviating the servo track a specified distance from a servo reader. An optimal offset position is then determined based on collected read error data versus offset position data. During subsequent write operations, tapes are offset according to the optimal offset position.

14 Claims, 4 Drawing Sheets

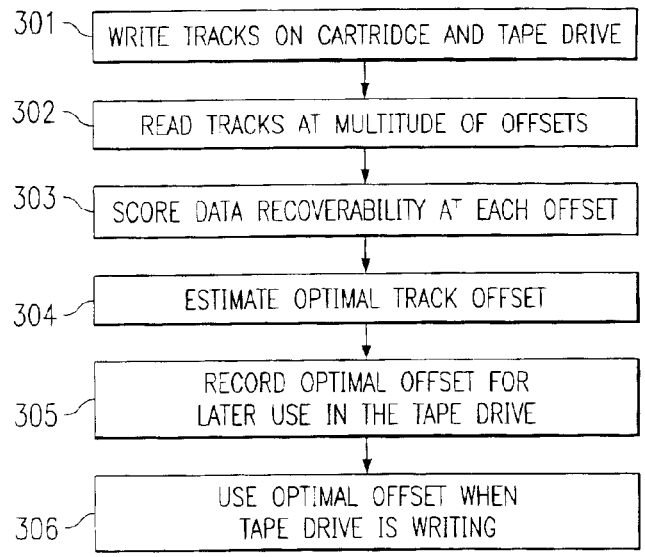
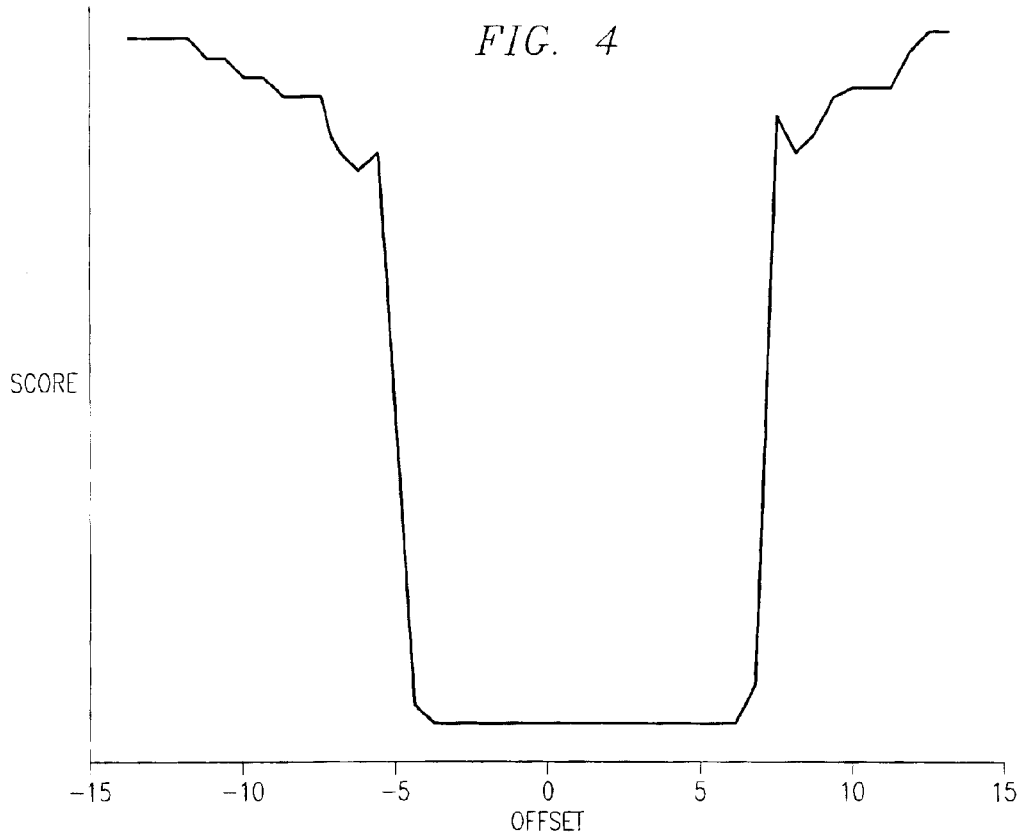

METHOD FOR WRITE TRACK PLACEMENT CORRECTION

BACKGROUND OF THE INVENTION

1. Field of the Invention

The present invention relates generally to recording on magnetic tape, and more specifically to correct placement of written tracks on magnetic media relative to the read elements.

2. Background of the Invention

Advanced tape storage devices read and write data on multiple data tracks, which run parallel to each other over the length of the tape. However, there is an inherent problem associated with independent data tracks. As the tape moves past the tape head, lateral drift of the tape can result in the head reading or writing on the wrong data track. This would obviously degrade the quality of data storage and retrieval. To ensure that the tape heads are accurately positioned relative to the tape, dedicated servo tracks are usually recorded on the tape parallel to the data tracks. These servo tracks are read by servo readers on the tape head. The servo readers then signal mechanisms within the tape drive that are capable of adjusting the tape head in order to maintain proper alignment with the data tracks.

As higher track densities are achieved in tape drives, the need to place the written tracks in precisely the correct locations becomes crucial. As explained above, a track-following servo system is typically employed in this effort. Unfortunately, the servo readers are laterally displaced along the direction of tape motion from the data writers. This leads to errors in placing the written track in the correct location. These errors can arise from non-ideal head construction (bump alignment) and non-perpendicular tape motion with respect to the head (azimuth error).

Therefore, it would be desirable to have a method for aligning write tracks on magnetic tapes in order to compensate for non-ideal head construction and non-ideal motion of the tape past the head.

SUMMARY OF THE INVENTION

The present invention provides a method for correcting data track placement in a magnetic tape drive. The invention comprises writing at least one data track on a magnetic tape, wherein the data track is written in a location determined by tracking a servo track on the tape. The tape drive reads the data track(s) at a plurality of offset positions, wherein each offset position is determined by deviating the servo track a specified distance from a servo reader. An optimal offset position is then determined based on collected read error data versus offset position data. During subsequent write operations, tapes are offset according to the optimal offset position.

BRIEF DESCRIPTION OF THE DRAWINGS

The novel features characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating the process of position error correction in accordance with the present invention;

FIG. 4 depicts a graph illustrating data recoverability scores in accordance with the present invention;

DETAILED DESCRIPTION OF THE PREFERRED EMBODIMENT

Figure 1:
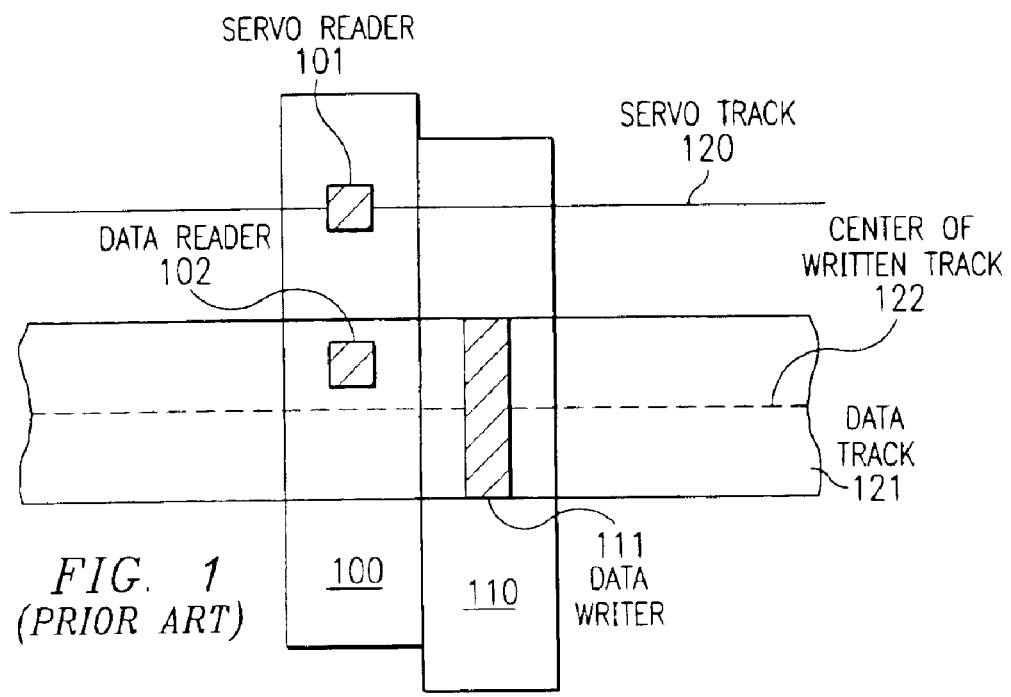
FIG. 1 depicts a schematic diagram illustrating a magnetic tape head without write track placement correction in accordance with the prior art.

Referring now to FIG. 1, a schematic diagram illustrating a magnetic tape head without write track placement correction is depicted in accordance with the prior art. The functional components of the tape head are found on two bumps 100 and 110. Bump 100 contains the servo reader 101 and data reader 102. Bump 110 contains the data writer 111. The magnetic tape is represented by a servo track 120 and data track 121.

As can be seen in FIG. 1, the bumps 100 and 110 are not perfectly aligned, with bump 110 slightly lower than bump 100. This misalignment occurs during the manufacture of the tape head and results from tolerance limits in the assembly process. For purposes of illustration, the misalignment is exaggerated in FIG. 1. Because the servo reader 101 is displaced along the direction of tape motion, the misalignment of the bumps 100 and 110 can result in errors in placing the written data track 121 in the correct location during write operation.

During write operations, the servo track 120 moves directly over the servo reader 101 as the data writer 111 writes the data track 121. Naturally, during the write operation, the data track center 122 is aligned with the center of the data writer 111. However, as can be seen in FIG. 1, during subsequent read operations, the data reader 102 is not aligned with the center 122 of the data track 121. This misalignment of the data reader 102 and data track center 122 is due to the misalignment of the bumps 100 and 110. Because the data reader 102 is not aligned with the data track center 122, and reads toward the outside of the data track 121, there is a greater chance of read errors. This problem becomes worse when azimuth errors are introduced into the picture.

Figure 2:
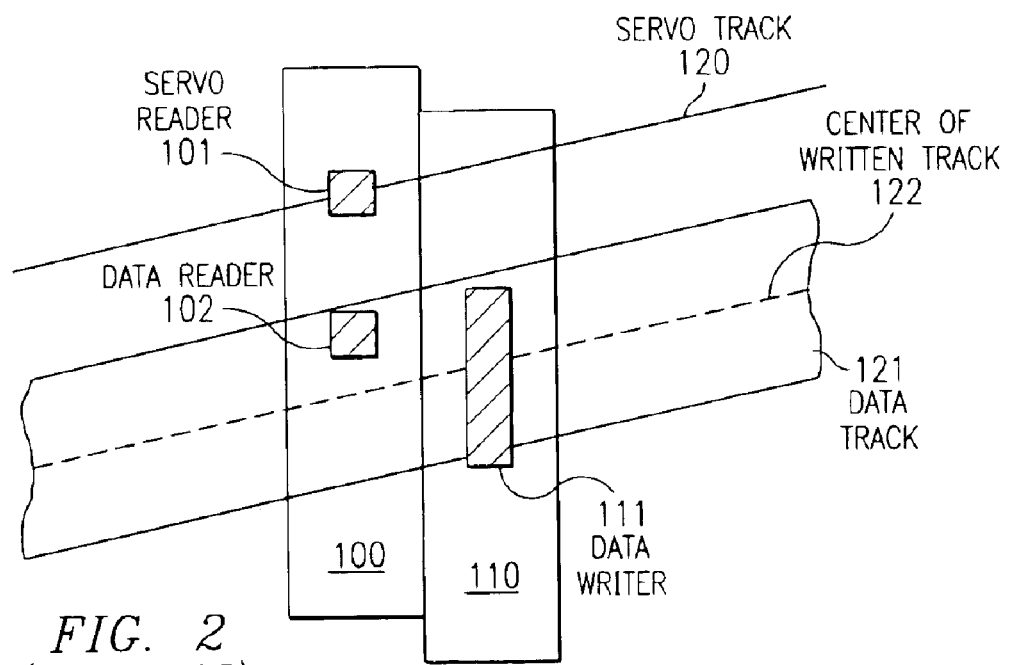
FIG. 2 depicts a schematic diagram illustrating the tape head in FIG. 1, with the addition of tape azimuth error.

Referring to FIG. 2, a schematic diagram illustrating the tape head in FIG. 1, with the addition of tape azimuth error, is depicted in accordance with the prior art. For purposes of illustration, the diagonal azimuth error is exaggerated in FIG. 2. Azimuth errors result from non-perpendicular motion with respect to the heads. As described above, bump misalignment causes the data reader 102 to read toward the outside of the data track 121. The addition of azimuth error increases the likelihood of read errors by causing the data reader 102 to read even closer to the edge of the data track 121, as is clearly illustrated in FIG. 2. This imprecise location of the written track 121 relative to the data reader 102 becomes increasingly problematic as track densities increase.

The present invention provides a method to correct for some of the errors that cause written data tracks to be misplaced during write operations.

Referring to FIG. 3, a flowchart illustrating the process of position error correction is depicted in accordance with the present invention. Servo tracks are placed on magnetic tapes during the manufacture process. The present invention uses these prewritten tracks to calibrate a given tape drive in order to compensate for non-ideal assembly of components during the manufacturing process.

The process begins by writing one or several tracks on a given cartridge and tape drive (step 301). The tracks are written at the nominal location determined by the pre-written servo tracks on the tape, without any attempt at correction. This means that the servo tracks are aligned directly over the servo readers, as pictured in FIGS. 1 and 2, and the data tracks are written according to this tape position.

After the data tracks have been written, they are read at a multitude of offsets from the nominal read location (step 302). This process comprises offsetting the servo tracks from the servo readers by a specified distance (e.g., one micron), reading the data tracks at this offset, and repeating the process at other offset distances (e.g., two microns, three microns, etc). Recoverability of the data is scored at each one of these offset locations (step 303).

Referring to FIG. 4, a graph illustrating data recoverability scores is depicted in accordance with the present invention. As explained above, the data tracks are read at a variety of offsets, and data recovery is recorded and scored at each one of these distances. The vertical axis represents data recovery errors, and the horizontal axis represents the offset distance (in microns). As depicted in FIG. 4, plotting error rate versus offset distance generally produces a "bathtub" shaped curve. The bottom of the "bathtub" represents the range of offset distances that produce the lowest level of read errors. Outside of this offset range, the error rates increase significantly. In the example illustrated in FIG. 4, the error rate starts climbing at approximately −4 and +6 microns from zero.

Returning to the process flow in FIG. 3, an optimal track offset is estimated from the collected data of track offsets versus data error rates (step 304). The optimal offset can be determined in a number of ways.

Figure 5:
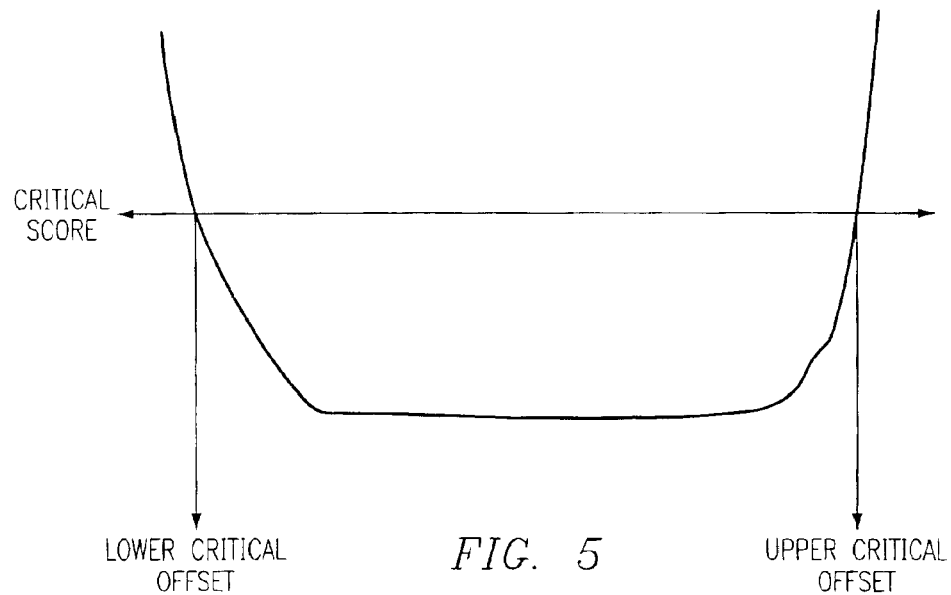
FIG. 5 depicts a graph illustrating a method for calculating optimal track offset by averaging offset values in accordance with the present invention.

Referring to FIG. 5, a graph illustrating a method for calculating optimal track offset by averaging offset values is depicted in accordance with the present invention. The bottom part of the curve is defined by a critical error score and a lower and upper critical offset. The critical error score represents the highest acceptable level of read errors. The lower and upper critical offsets are the intersection points between the critical error score and the error/offset curve. The optimal offset is calculated by simply adding the lower and upper critical offset values and dividing the sum by two. Thus, for the example in FIG. 4, the optimal offset is approximately one micron. Error rates do not start to rise beyond the critical score until approximately equal distance in both directions from this optimal offset.

Figure 6:
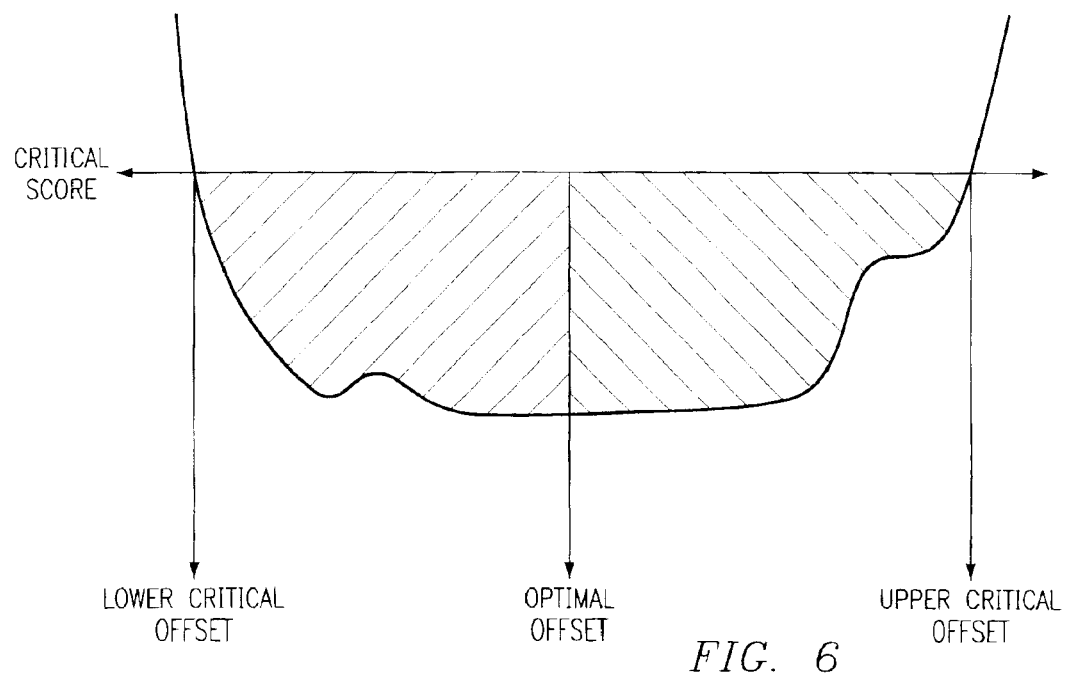
FIG. 6 depicts a graph illustrating a method for calculating optimal track offset by integrating a defined area of the error/offset graph in accordance with the present invention.

Referring now to FIG. 6, a graph illustrating a method for calculating optimal track offset by integrating a defined area of the error/offset graph is depicted in accordance with the present invention. This second method for determining the optimal offset is to integrate the area defined by the critical score and the lower and upper critical offsets. The optimal offset balances the areas between the critical score, the recoverability score and the optimal offset. Therefore, the calculation would be:

$$\int_{LowerCriticalOffset}^{OptimalOffset} CriticalScore - ErrorScore \, d\,Offset =$$

$$\int_{OptimalOffset}^{UpperCriticalOffset} CriticalScore - ErrorScore \, d\,Offset$$

The optimal offset is found such that the above two integrals are equal.

Returning to FIG. 3, once the optimal offset is calculated, it is recorded for later use by the tape drive (step 305).

After the optimal offset for a particular tape drive is determined and recorded, the tape drive uses this optimal offset during subsequent write operations (step 306). However, during subsequent read operations, no offset is used.

Figure 7:
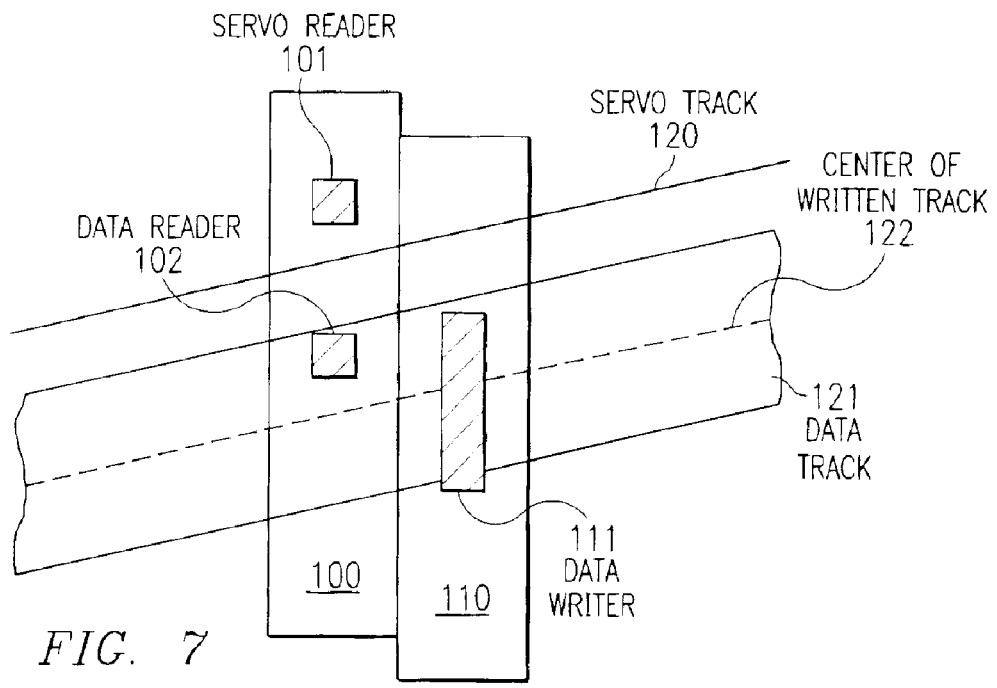
FIG. 7 depicts a schematic diagram illustrating a tape drive using the optimal offset during a write operation in accordance with the present invention.

Referring to FIG. 7 a schematic diagram illustrating a tape drive using the optimal offset during a write operation is depicted in accordance with the present invention. Instead of tracking the nominal track position, the drive uses the optimal offset distance to offset the servo track 120 from the servo reader 101. As a result of this offset, the center 122 of the written data track 121 is closer to the servo track than it would be without the offset (as in FIGS. 1 and 2). This shorter distance allows for better data track alignment during subsequent read operations.

Figure 8:
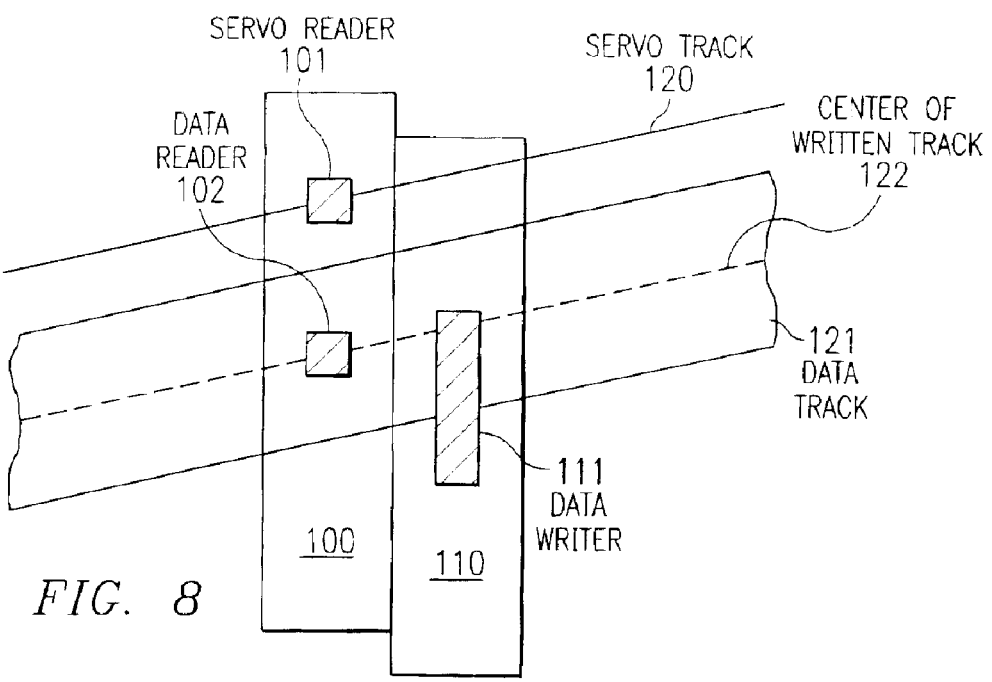
FIG. 8 depicts a schematic diagram illustrating a tape drive reading tracks previously written using data track placement correction in accordance with the present invention.

Referring now to FIG. 8 a schematic diagram illustrating a tape drive reading tracks previously written using data track placement correction is depicted in accordance with the present invention. After the data track 121 is written using the optimal offset (as depicted in FIG. 7), the servo track 120 is aligned over the servo reader 101 when the data is read. Because of the offset used while writing the data track 121, the data track center 122 will be aligned directly over the data reader 102 when the servo track 120 is returned to its nominal location over the servo reader 101.

In this way, data track placement correction compensates for bump misalignment and azimuth errors to help ensure that the data reader reads close to the center 122 of the data track 121, thus reducing the likelihood of read errors. By providing increased accuracy in data writing and thus minimizing read errors, the present invention facilitates more data storage on a given tape than would otherwise be possible.

Write track placement correction is used rather than using offsets during read operations to ensure that all tape drives place the written tracks at the same location. If different drives are allowed to misplace the written tracks then tracks written in one drive could partially overlap tracks previously written in another drive. The narrowed tracks would be more difficult to read in any drive.

While the present invention has been described for use during manufacture calibration, it should be pointed out. that the write track correction method may also be used for on-the-fly tape head calibration during normal operations.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for correcting data track placement in a magnetic tape drive, the method comprising:

writing at least one data track on a magnetic tape, wherein the data track is written in a location determined by tracking a servo track on the tape;

reading the data track at a plurality of offset positions to collect a data track read error corresponding to each offset position, wherein each offset position is determined by deviating the servo track a preselected known distance from a servo reader;

determining an optimal offset position based on the collected data track read errors and the offset positions respectively corresponding to the data track read errors; and offsetting tapes during subsequent write operations, according to the optimal offset position.

2. The method according to claim 1, further comprising tracking tapes in a nominal position during subsequent read operations, wherein the servo track is aligned with the servo reader.

3. The method according to claim 1, wherein the initial step of writing the data track further comprises writing the track in a nominal location determined by aligning the servo track with a servo reader.

4. A system for correcting data track placement in a magnetic tape drive, the system comprising:

a means for writing at least one data track on a magnetic tape, wherein the data track is written in a location determined by tracking a servo track on the tape;

a means for reading the data track at a plurality of offset positions, wherein each offset position is determined by deviating the servo track a specified distance from a servo reader;

a means for determining an optimal offset position based on collected read error data versus offset position data; and a means for offsetting tapes during subsequent write operations, according to the optimal offset position.

5. A method for correcting data track placement in a magnetic tape drive, the method comprising:

writing at least one data track on a magnetic tape, wherein the data track is written in a location determined by tracking a servo track on the tape;

reading the data track at a plurality of offset positions, wherein each offset position is determined by deviating the servo track a specified distance from a servo reader;

plotting a curve of read error data versus offset position data;

specifying a critical error score;

determining lower and upper critical offset values that correspond to intersections between the curve and the critical error score;

determining an optimal offset position based on the lower and upper critical offset values; and offsetting tapes during subsequent write operations, according to the optimal offset position.

6. The method according to claim 5, wherein the step of determining the optimal offset position further comprises:

averaging the lower and upper critical offset values.

7. The method according to claim 5, wherein the step of determining the optimal offset position further comprises:

integrating an area defined by the critical read error score and the lower and upper offset values.

8. The method according to claim 5, wherein the steps of writing the data track, reading the data track in the offset positions, and estimating the optimal offset position are performed during manufacture of the tape drive.

9. The method according to claim 5, wherein the steps of writing the data track, reading the data track in the offset positions, and estimating the optimal offset position are performed during tape drive operations.

10. The method according to claim 5, further comprising tracking tapes in a nominal position during subsequent read operations, wherein the servo track is aligned with the servo reader.

11. The method according to claim 5, wherein the initial step of writing the data track further comprises writing the track in a nominal location determined by aligning the servo track with a servo reader.

12. A computer program product in a computer readable medium for use in a data processing system, for correcting data track placement in a magnetic tape drive, the computer program product comprising:

instructions for writing at least one data track on a magnetic tape, wherein the data track is written in a location determined by tracking a servo track on the tape;

instructions for reading the data track at a plurality of offset positions, wherein each offset position is determined by deviating the servo track a specified distance from a servo reader;

instructions for plotting a curve of read error data versus offset position data;

instructions for specifying a critical error score;

instructions for determining lower and upper critical offset values that correspond to intersections between the curve and the critical error score;

instructions for determining an optimal offset position based on the lower and upper critical offset values; and instructions for offsetting tapes during subsequent write operations, according to the optimal offset position.

13. The computer program product according to claim 12, wherein the instructions for determining the optimal offset position further comprise:

instructions for averaging the lower and upper critical offset values.

14. The computer program product according to claim 12, wherein the instructions for determining the optimal offset position further comprise:

instructions for integrating an area defined by the critical read error score and the lower and upper offset values.

* * * * *